United States Patent
Delk

(10) Patent No.: US 10,366,394 B2
(45) Date of Patent: Jul. 30, 2019

(54) SERVICE MANAGEMENT SYSTEMS AND ASSOCIATED METHODS

(71) Applicant: Louis D. Delk, Phoenix, AZ (US)

(72) Inventor: Louis D. Delk, Phoenix, AZ (US)

(*) Notice: Subject to any disclaimer, the term of this patent is extended or adjusted under 35 U.S.C. 154(b) by 486 days.

(21) Appl. No.: 14/717,461

(22) Filed: May 20, 2015

(65) Prior Publication Data

US 2015/0254671 A1 Sep. 10, 2015

Related U.S. Application Data

(63) Continuation of application No. 12/523,714, filed as application No. PCT/US2008/053995 on Feb. 14, 2008, now abandoned.
(Continued)

(51) Int. Cl.
*G06Q 20/40* (2012.01)
*G06Q 10/08* (2012.01)
(Continued)

(52) U.S. Cl.
CPC ....... *G06Q 20/4037* (2013.01); *G06Q 10/087* (2013.01); *G06Q 20/102* (2013.01);
(Continued)

(58) Field of Classification Search
None
See application file for complete search history.

(56) References Cited

U.S. PATENT DOCUMENTS 5,680,305 A 10/1997 Apgar, IV
6,023,687 A 2/2000 Weatherly et al.
(Continued)

FOREIGN PATENT DOCUMENTS

WO WO-2008/101103 8/2008

OTHER PUBLICATIONS

Howes, Kathy. "An in-Depth Look at Consolidating Debts." Heavy Construction News 45.1 (2001): 30. ProQuest. May 15, 2019 . ( Year: 2001).*
(Continued)

*Primary Examiner* — Andrew B Whitaker
(74) *Attorney, Agent, or Firm* — Perkins Coie LLP

(57) ABSTRACT

Service management systems and associated methods are disclosed herein. In one embodiment, a service management system can include a system for delivering various types of services including property management services, residential rental services, social services, low income housing services, and/or the like. One aspect of the disclosure is directed toward a computer implemented service management process (e.g., a property management process) that includes maintaining an inventory of property associated with a rental program, providing information associated with the rental program, processing an application to enter the program from a potential program participant, and administering various program elements of the rental program. In selected embodiments, the method can further include providing products/services and/or providing advertising. In still further embodiments, the method can include terminating the program participant's participation in the rental program/service management process.

22 Claims, 11 Drawing Sheets

Related U.S. Application Data

(60) Provisional application No. 60/890,441, filed on Feb. 16, 2007.

(51) Int. Cl.
    *G06Q 20/10*    (2012.01)
    *G06Q 50/16*    (2012.01)
    *G06Q 30/02*    (2012.01)
    *G06Q 30/06*    (2012.01)
    *G06Q 40/02*    (2012.01)

(52) U.S. Cl.
    CPC ..... *G06Q 30/0251* (2013.01); *G06Q 30/0645* (2013.01); *G06Q 40/02* (2013.01); *G06Q 50/163* (2013.01)

(56) References Cited

U.S. PATENT DOCUMENTS

| | | |
|---|---|---|
| 6,947,907 B1 | 9/2005 | Silverman |
| 7,877,322 B2 | 1/2011 | Nathans et al. |
| 2001/0037280 A1 | 11/2001 | Ingraham et al. |
| 2002/0147677 A1 | 10/2002 | Brady |
| 2002/0198835 A1* | 12/2002 | Watson ............ G06Q 20/10 705/40 |
| 2003/0023453 A1 | 1/2003 | Hafen et al. |
| 2003/0093289 A1* | 5/2003 | Thornley ........... G06Q 10/10 705/307 |
| 2003/0225599 A1 | 12/2003 | Mueller et al. |
| 2004/0030616 A1 | 2/2004 | Florence et al. |
| 2004/0044607 A1 | 3/2004 | Hedrick et al. |
| 2004/0049458 A1 | 3/2004 | Kunugi et al. |
| 2004/0059672 A1 | 3/2004 | Baig et al. |
| 2005/0097033 A1 | 5/2005 | Pretell et al. |
| 2005/0144028 A1 | 6/2005 | Donahue et al. |
| 2005/0251474 A1 | 11/2005 | Shinn et al. |
| 2006/0184440 A1 | 8/2006 | Britti et al. |
| 2006/0190279 A1* | 8/2006 | Heflin ............... G06Q 30/00 705/307 |
| 2006/0195351 A1 | 8/2006 | Bayburtian |
| 2007/0288360 A1 | 12/2007 | Seeklus |
| 2008/0027859 A1* | 1/2008 | Nathans ............. G06Q 10/00 705/38 |
| 2009/0171699 A1 | 7/2009 | Langford et al. |
| 2010/0268653 A1 | 10/2010 | Ingraham et al. |

OTHER PUBLICATIONS

Final Office Action for U.S. Appl. No. 12/523,714, dated Jan. 6, 2012, 12 pages.
Final Office Action for U.S. Appl. No. 12/523,714, dated Feb. 20, 2015, 20 pages.
International Search Report and Written Opinion for International App. No. PCT/US2008/053995, dated Aug. 8, 2008, 14 pages.
Non Final Office Action for U.S. Appl. No. 12/523,714, dated Dec. 22, 2010, 13 pages.
Non Final Office Action for U.S. Appl. No. 12/523,714, dated May 9, 2014, 19 pages.
Non Final Office Action for U.S. Appl. No. 12/523,714, dated Aug. 25, 2014, 18 pages.
Non Final Office Action for U.S. Appl. No. 12/523,714, dated Jun. 10, 2011, 12 pages.

* cited by examiner

SERVICE MANAGEMENT SYSTEMS AND ASSOCIATED METHODS

CROSS-REFERENCE TO RELATED APPLICATION(S)

The present application is a continuation of U.S. patent application Ser. No. 12/523,714, filed on Feb. 4, 2010, entitled "SERVICE MANAGEMENT SYSTEMS AND ASSOCIATED METHODS," which is a national stage entry under 35 U.S.C § 371 of International Application No. PCT/US2008/053995, filed on Feb. 14, 2008, entitled "SERVICE MANAGEMENT SYSTEMS AND ASSOCIATED METHODS," which claims priority to U.S. Provisional Patent Application No. 60/890,441, filed on Feb. 16, 2007, all of which are incorporated herein by reference in their entireties.

TECHNICAL FIELD

The following disclosure relates generally to service management systems and associated methods.

BACKGROUND

Homelessness is a significant problem in the United States and throughout the world. Individuals and families can be forced into homelessness by many factors. For example, individuals and their families can be forced into homelessness by various life circumstances including poverty, unemployment, domestic violence, addiction, mental health issues, poor credit, divorce, physical or mental disabilities, poor budgeting skills, foreclosure, and/or various legal issues. In many cases, it is not a lack of housing units that cause homelessness, but the lack of affordable housing available for rent. In other cases, various circumstances prevent individuals from being able to financially qualify to rent available rental units (e.g., due to bad credit).

In the United States, there are various government programs, laws, and regulations aimed at helping the homeless and reducing the homeless rate, including programs at the federal, state, and local levels. For example, some of these programs include the Federal Low Income Housing Tax Credit Program, Section 8 housing, and programs associated with the McKinney Act. Additionally, there are many charities and other social service agencies that aid the homelessness and reduce the homeless rate. Some of these organizations include churches, various shelters, and half-way houses for individuals released from correctional institutions.

Despite these programs, laws, regulations, and organizations, homelessness continues to be a significant problem. For example, according to the *Current Status of Homelessness in Arizona and Efforts to Prevent and Alleviate Homelessness,* 14th annual report, December 2005, prepared by Homeless Coordination Office Community Services Administration Department of Economic Security, it is estimated that, on any given day, there may be as many as 20,000 to 30,000 homeless people in the state of Arizona alone. Accordingly, other solutions are needed to address these issues.

DETAILED DESCRIPTION

Figure 1:
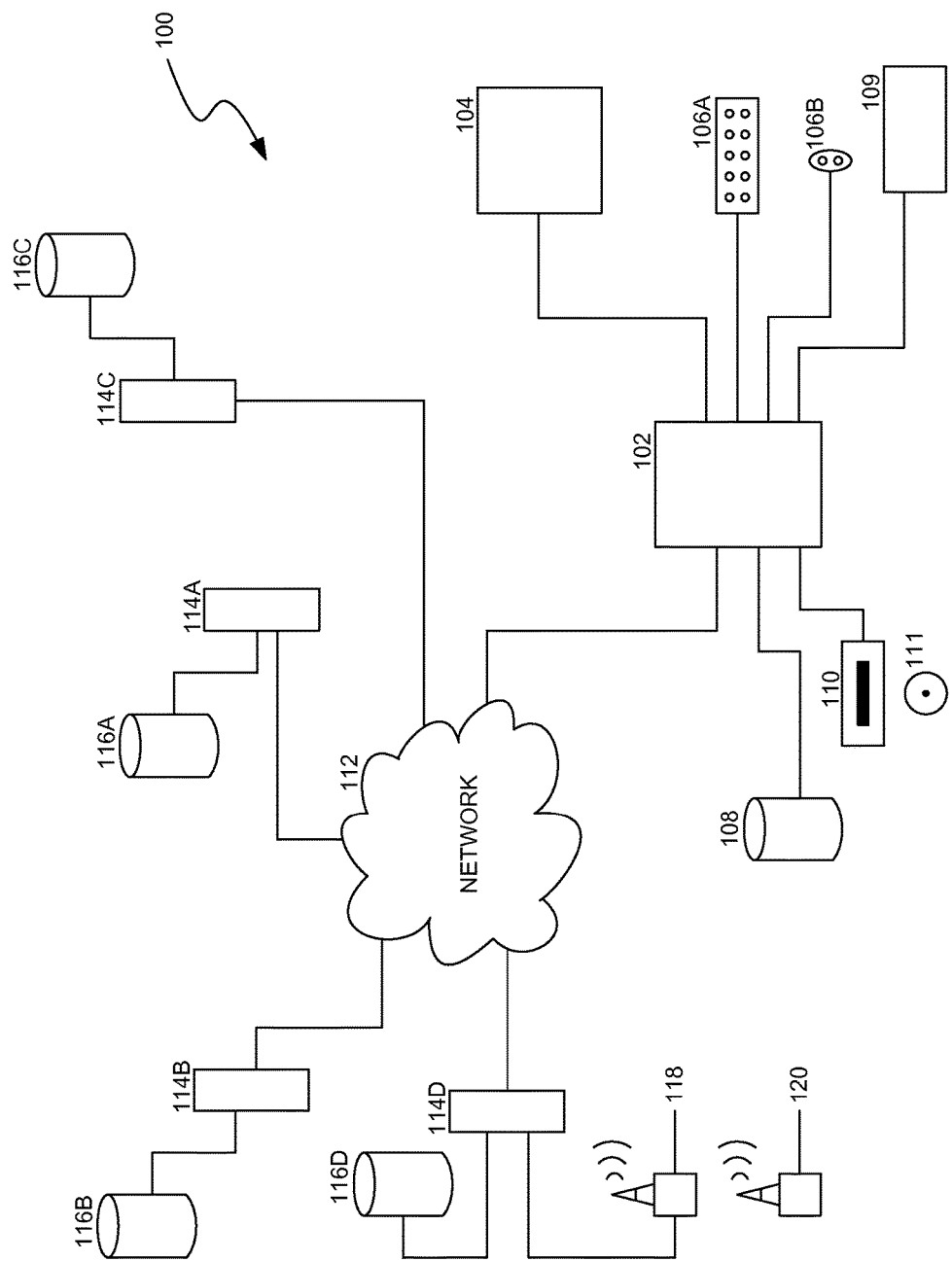
FIG. 1 is a partially schematic illustration of a computing environment suitable for implementing a service management process in accordance with embodiments of the disclosure.

The following disclosure is directed generally to service management systems and associated methods. For example, a service management system can include a system for delivering various types of services including property management services, residential rental services, rent to own services, social services, low income housing services, and/or the like. One aspect of the disclosure is directed toward a computer implemented service management process (e.g., a property management process) that includes maintaining an inventory of property associated with a rental program, providing information associated with the rental program, processing an application to enter the program from a potential program participant, and administering various program elements of the rental program. In selected embodiments, the method can further include providing products/services and/or providing advertising. In still further embodiments, the method can include terminating the program participant's participation in the rental program/service management process.

For example, in selected embodiments a service management process can include a rental program that assists individuals and/or families in obtaining housing, along with other forms of assistance or services. The program can emphasize budgeting, the role that budgeting plays in managing an individual's finances, and/or the affect that budgeting has on an individual's daily activities. As part of processing the application, the program can utilize intake screening, background checks (e.g., national and/or worldwide background checks), and/or various identification tools (e.g., voice and visual recognition tools). Additionally, in certain embodiments the program can provide educational services and/or counseling services to help individuals understand the circumstance (e.g., economic circumstance) they are in and ways to improve their economic position and/or life.

In selected embodiments, the program can require that participants demonstrate accountability, give participants the tools they need to become accountable, and assist participants in working toward achieving stability in their lives. For example, in selected embodiments participation in the program can require, within the limits of the law, that a participant agree to meet selected program elements, conditions, and/or requirements. For instance, in certain embodiments a participant may, within the limits of the law, be required to (1) make weekly program payments, (2) maintain employment, (3) remain drug and/or alcohol free, (4) attend or complete selected training, (5) establish and/or use a budget, (6) relinquish certain rights that the participant may be entitled to pursuant to a governing landlord tenant act and/or pending civil court proceeding, (7) agree to an immediate dispossession of a property as one of the consequences of non-compliance with certain program elements, and/or (8) agree to various tracking and/or monitoring processes.

In certain embodiments, requiring participants to agree to meet (e.g., perform) selected program elements, conditions, and/or requirements, the participant can learn to be accountable, improve his or her life circumstance, or both. Additionally, in selected embodiments adherence to selected program elements can reduce the risk associated with renting property to the participant. Accordingly, in some embodiments landlords or property owners may be more willing to allow program participants to occupy their rental properties, for example, even though the participants would not normally qualify to rent the properties (e.g., for financial/credit reasons, legal issues, and/or the like).

One particular aspect of the disclosure is directed to a service management system for managing and maintaining an inventory of real property associated with a rental program and matching participants of the rental program with corresponding properties in the inventory. The system can include one or more data storage components configured to store an inventory of real property associated with the rental program. The system can also include one or more data processing components coupled to the one or more data storage components. The one or more data processing components are configured to (a) process requests from applicants for information regarding the rental program, (b) manage and maintain the inventory of property associated with the rental program, (c) process an application of an applicant to become a program participant, and (d) match a program participant with one or more properties in the inventory based, at least in part, on the program participant's demographic information and the program participant's desired geographic location.

Another particular aspect of the disclosure is directed to a computer-implemented method for managing a rental program. The method can include storing and managing an inventory of real property associated with the rental program. The method also includes receiving a request from an applicant to become a participant in the rental program and, in response to receiving the request, processing an application of the applicant to become a participant in the rental program. Upon approval of the application, the method further includes matching the program participant with one or more properties in the inventory based, at least in part, on the program participant's demographic information and the program participant's desired geographic location.

Yet another particular aspect of the disclosure is directed to one or more computer-readable media collectively storing computer-executable instructions that, when executed, perform a method for managing a rental program for low income individuals and families. The method includes managing an inventory of individual housing units associated with the rental program. The method also includes processing an application of an applicant to become a participant in the rental program and, upon approval of the application, matching the program participant with a housing unit in the inventory. The program participant is matched with the housing unit based, at least in part, on selected demographic information of the individual program participant, a desired geographic area in which the program participant would like to live, and a desired disbursement of multiple program participants in a selected geographic area.

Still another particular aspect of the disclosure is directed to a system for providing housing services to families and individuals. The system can include means for storing and managing an inventory of individual housing units available for use with the rental program. The system can also include means for receiving a request from an applicant to become a participant in the rental program and means for processing an application of the applicant to become a rental program participant. The system can further include means for linking individual program participants with a housing unit in the inventory based, at least in part, on a desired distribution of multiple program participants in a selected geographic area, demographic criteria associated with the individual program participant, and a desired geographic area in which the individual program participant would like to live.

Many specific details of certain embodiments of the disclosure are set forth in the following description and in FIGS. 1-11 to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

In describing the various embodiments, a computing environment suitable for implementing processes related to services (e.g., social services, credit reporting services, lending and payment services, property management services, rental program services including tenant management services, etc.) and/or configured as a service management system in accordance with selected embodiments will be discussed. Then various aspects of a service management method in accordance with certain embodiments of the disclosure will be described. Finally, selected uses for and variations of methods and systems in accordance with selected embodiments will be examined.

FIG. 1 is a block diagram that illustrates a computing environment suitable for implementing a process related to a service in accordance with embodiments of the disclosure. The computing environment 100 can include a computing or computer system 102 that can be operably connected or coupled to a display 104 and one or more input devices, for example, a keyboard 106a and a pointing device 106b (e.g., a mouse). Additionally, the computer system 102 can communicate with one or more data storage devices (e.g., a hard drive 108 with one or more databases) and one or more devices 110 for reading other types of computer readable mediums (e.g., devices for reading disks 111). The computing system 102 can also communicate directly with other devices 109, for example, a phone and/or fax system, or with other devices or systems via a network 112 (e.g., via the Internet). For example, in the illustrated embodiment the computer system 102 can communicate with other computer systems 114a-d and/or other databases 116a-d via the network 112. Additionally, in selected embodiments the computing system can communicate with wireless devices 120 (e.g., a wireless computing device such as a personal data assistant and/or cellular phone) via a wireless transmitter/receiver (e.g., a service provider connected to the internet). In other embodiments, the computing environment can have other arrangements, including more, fewer, and/or different components.

For example, the computing device or environment on which the system is implemented may include a central processing unit, memory, input devices (e.g., keyboard, pointing devices, cameras for visual recognition tools, microphones for voice recognition tools, and/or the like), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments or systems that include any of the above systems or devices, and so on. The computer systems may include cell phones, personal digital assistants, smart phones, personal computers, programmable consumer electronics, digital cameras, computer kiosks, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
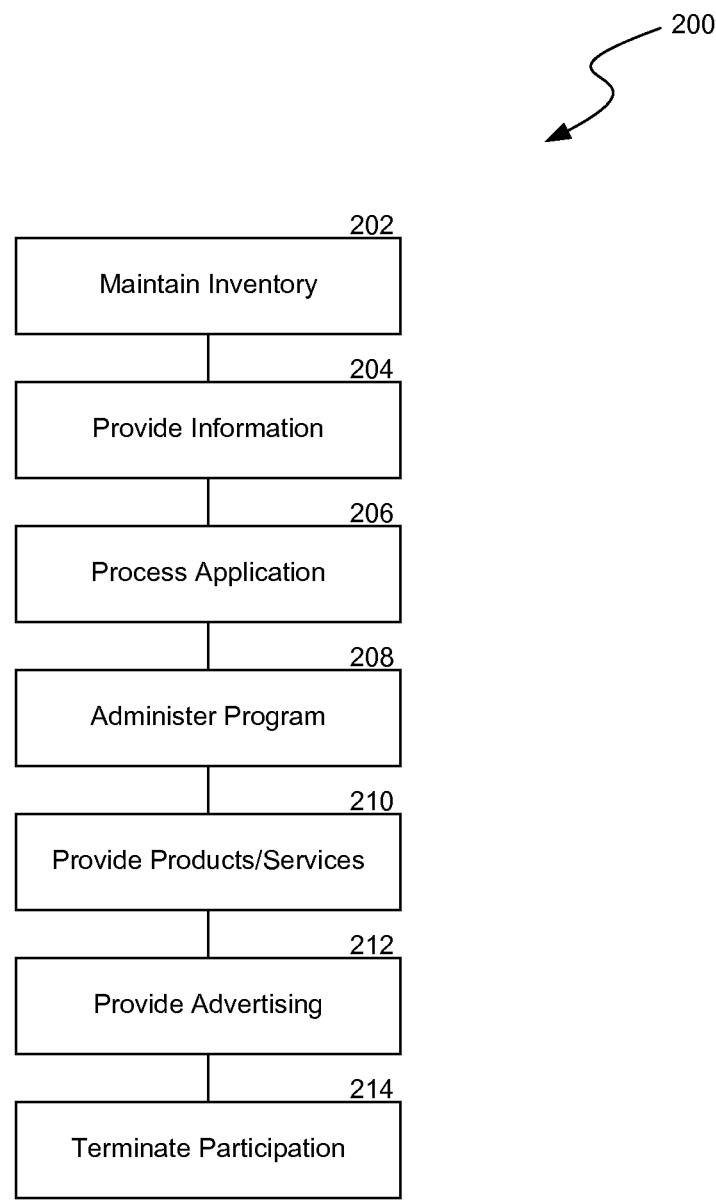
FIG. 2 is a flow diagram that illustrates a service management process in accordance with selected embodiments of the disclosure.

FIG. 2 is a flow diagram illustrating a service management process 200 in accordance with selected embodiments. For example, in certain embodiments the process 200 can include managing and maintaining an inventory of property associated with a rental program (process portion 202), providing information associated with the rental program (process portion 204), processing an application to enter the program from a potential program participant (process portion 206), and administering various program elements of the rental program (process portion 208). In selected embodiments, the method can further include providing products/services (process portion 210) and/or providing advertising (process portion 212). In still further embodiments, the method can include terminating at least a portion of the participant's participation in the rental program/service management process (process portion 214). In certain embodiments, some or all of the elements associated with the service management process 200 can be computer implemented. For example, in certain embodiments a computing system can be configured to provide various elements associated with the service management process 200 via various screens or displays (e.g., over a network). In selected embodiments, these screens can be accessed via various computing device elements, for example, via a home computer, portable computing device, computer kiosk associated with the rental program, and/or the like.

Figure 3:
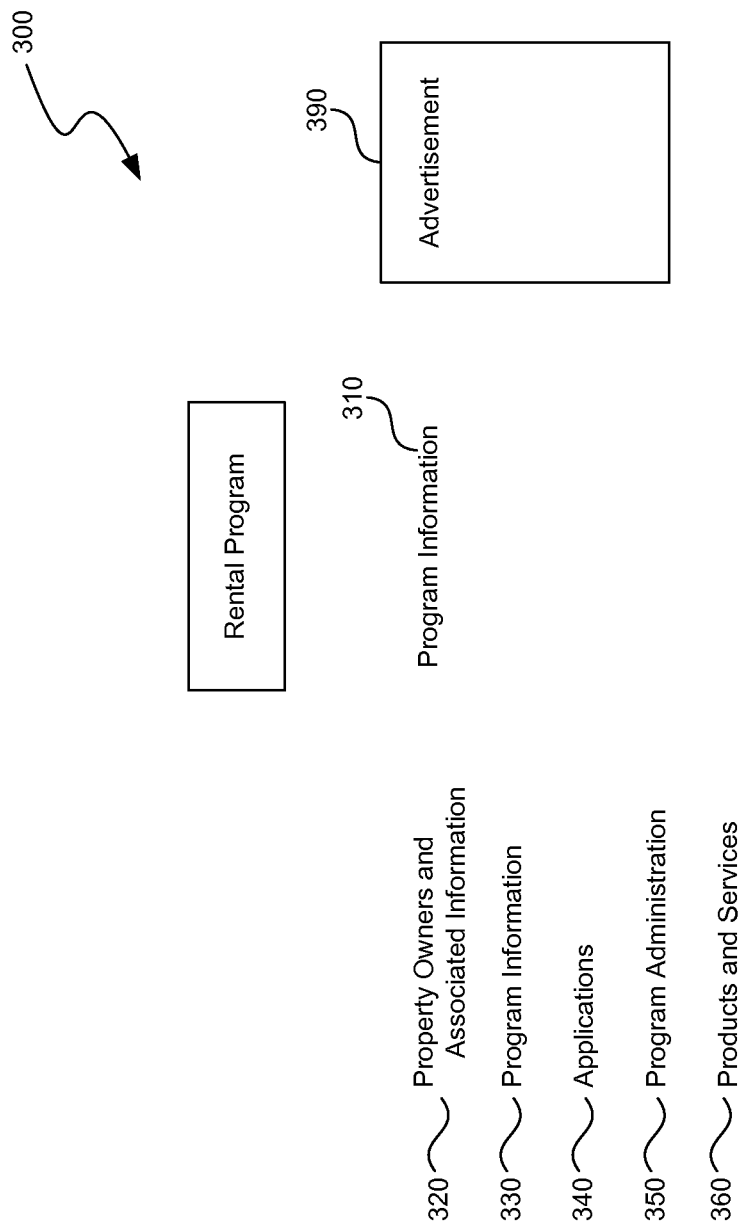
FIG. 3 is a partially schematic illustration of a Rental Program screen used to allow property owners or potential program participants to access information and/or to interact with various features of the service management process in accordance with embodiments of the disclosure.

FIG. 3 is a partially schematic illustration of a Rental Program screen 300 used to allow property owners or their designated representatives (e.g., a leasing agent), potential program participants or their designated representatives, and other parties to access information associated with, or provided by, the service management process and/or to interact with various features of the service management process in accordance with embodiments of the disclosure. In the illustrated embodiment, the screen 300 can provide general program information 310 associated with the service management process, including information associated with a rental program. This information can be provided in the form of text displayed on the screen and/or via one or more links (e.g., interactive computer links, hyperlinks, and/or the like) to additional pages that contain various pieces of information.

In selected embodiments, the Rental Program screen 300 in FIG. 3 can include one or more advertisements 390 (e.g., as part of process portion 212 discussed above with reference to FIG. 2). For example, in certain embodiments the advertisement 390 can include advertisements for products or services associated with the service management process 200 and/or the rental program (e.g., an advertisement for an online store discussed below in further detail and/or for rental property available via the rental program, such as units in an apartment complex). In other embodiments, the advertisement 390 can include information regarding products or services that might be of interest to individuals accessing the screen (e.g., an advertisement for a local church, a charity, a social service, and/or the like). In still other embodiments, the advertisement 390 can include information associated with providing a property for use in the rental program and/or soliciting property owners or their designated representatives to make property available for use in the rental program. In yet further embodiments, the advertisement 390 can include advertising for other entities (e.g., entities that purchase advertising space from a representative of the rental program and/or entities that support a portion of the service management process via donations).

In selected embodiments, the screen 300 can also provide links to other screens associated with various elements of the service management process discussed above with reference to FIG. 2. For example, in FIG. 3 the screen 300 includes a link to pages associated with property owners and associated information 320, program information 330, applications 340, program administration 350, and/or products and services process portion 360. Accordingly, in the illustrated embodiment a user can manage and access information associated with various portions of the service management process using screens associated with these links.

Maintaining an inventory of properties associated with the service management process (e.g., the rental program) can include obtaining properties to populate the inventory, enrolling the individual properties into the inventory, and tracking the properties contained in the inventory. For example, in selected embodiments various property owners can make their property available for use in the rental program. The service management process can then be used to enroll and track the status of the properties made available by the property owners. In other embodiments, at least some of the properties can be owned by the party or entity that manages or runs the rental program.

Figure 4:
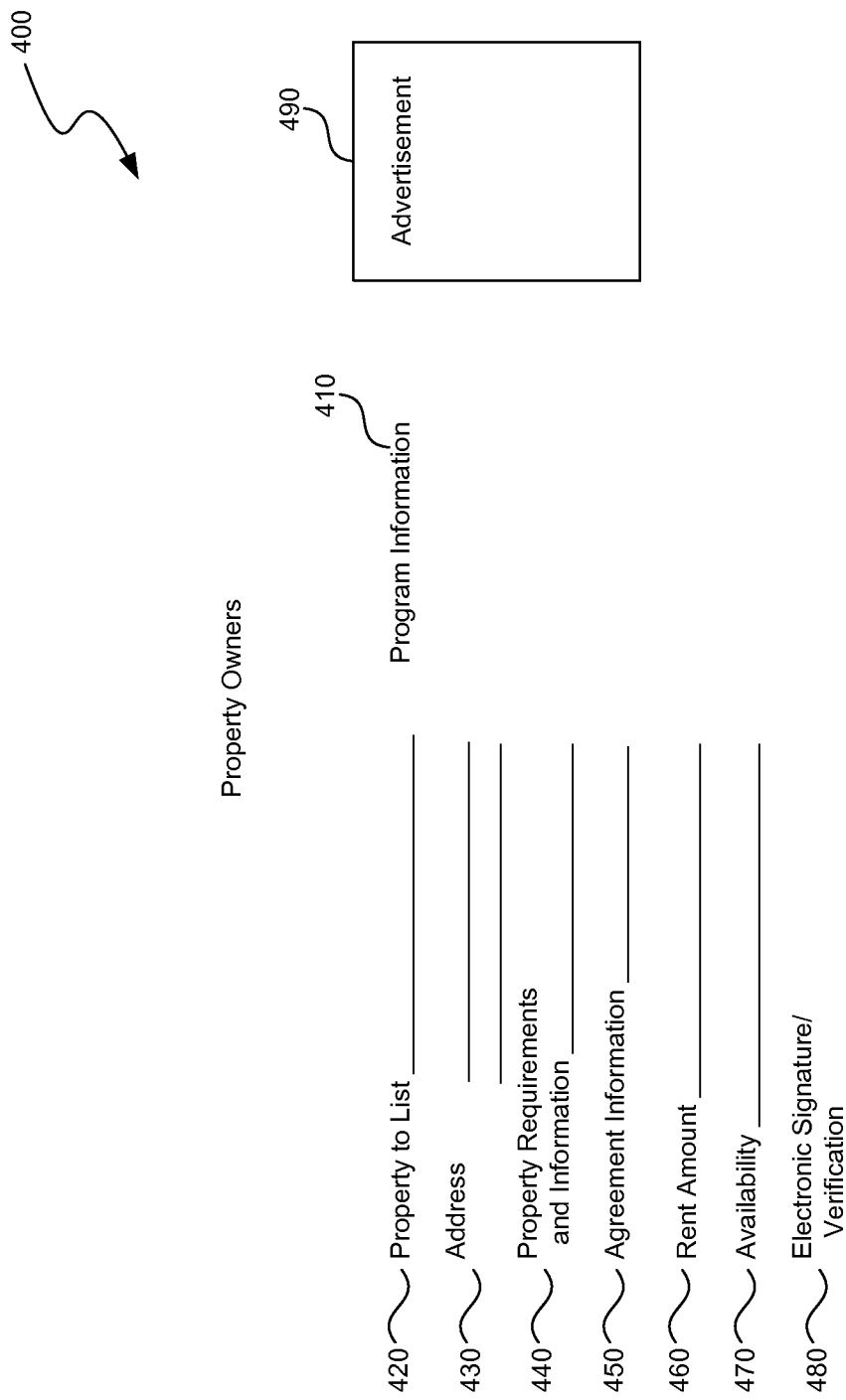
FIG. 4 is a partially schematic illustration of a Property Owners screen used to allow property owners to access information and/or to make rental units available for use in the service management process in accordance with selected embodiments of the disclosure.

FIG. 4 is a partially schematic illustration of a Property Owner screen 400 used to allow property owners (or their designated representatives) to access information and/or to make rental units available for use in the service management process in accordance with selected embodiments of the disclosure. For example, the screen 400 can include informational materials 410 in the form of text and/or interactive link(s). Additionally, the screen 400 can allow information about a property to be entered into inventory (e.g., entered into a database). For example, the name of the property (e.g., apartment complex and unit number) can be entered in the Property to List field 420, the address of the property can be entered in the Address Field 430, and the rent amount (e.g., the amount of rent required per week or per month) can be entered in the Rent Amount field 460, thereby associating the database entry with the property. In selected embodiments, the Property Owners screen 400 can allow a property owner or designated representative to make changes to the data associated with a property already contained in the database.

Additionally, in the illustrated embodiment a Property Requirements and Information field 440 can allow requirements and information associated with the property to be entered. For example, information can include the number of bedrooms included in the apartment, the number of bathrooms included in the apartment, the availability of parking, whether an apartment complex has a pool, and/or the like. Requirements can include restrictions, conditions, and/or other requirements that use of the property in the rental program is predicated on. For example, a rental unit might prohibit pets or require that payments be made weekly (if permitted by the applicable law). An availability field 470 can also allow availability information to be entered or associated with the property. For example, a rental unit might only be available after a selected date or for a selected period of time.

In certain embodiments lease, agreement, and/or contract terms can be viewed via an Agreement Information link 450. For example, in selected embodiments the property owners (or their designated representatives) can view lease terms associated with renting or leasing a property through the rental program. In certain embodiments, the Agreement Information link 450 can allow a property owners (or their designated representatives) to enter into a lease agreement or contract with an entity associated with the rental program (e.g., a rental program administrator), for example, via electronic signature or other forms of verification. In other embodiments, the Agreement Information link 450 can allow the property owners (or their designated representatives) to indicate that selected lease terms would be acceptable for placement of a potential program participant into the property and a lease or agreement can be executed at the time the program participant is placed into the property (e.g., the lease or agreement can be executed in electronic or paper form).

In still other embodiments, the Agreement Information link can allow property owners or their designated representatives to access an editable lease or agreement and allows the property owners or their designated representatives to make changes to the lease or agreement. A rental program operator or administrator can then approve or revise the changes. In other embodiments, the Agreement Information link 450 can provide a field that allows a user (e.g., a property owner or designated representative) to enter an electronic document that contains a lease or agreement into the system for storage and/or approval, revision, or comment by an administrator or operator of the rental program.

In the illustrated embodiment, the Property Owners screen 400 also includes an Electronic Signature/Verification field 480 that allows verification of one or more portions of data entered into the service management process and/or access to selected information. For example, in selected embodiments a property owner or the property owners designated representative can enter a password to verify access to associated information, to authenticate an identity, and/or for electronic signature purposes (e.g., to indicate agreement to selected terms or conditions). In other embodiments, the Electronic Signature/Verification field 480 can provide a verification process that allows a property owner/designated representative to enter information which can be used for identity verification (e.g., a credit card number, a PayPal® account, selected personal information, and/or the like). In still other embodiments, a property owner/designated representative gives information to a rental program representative (e.g., in person and/or via mail) for entry into the service management process and/or enters data into a computer kiosk (e.g., located at a rental program office) after having their identity verified and/or signing an appropriate consent forms.

In certain embodiments, the Property Owners screen 400 can also include one or more advertisements 490, similar to the advertisement discussed above with reference to FIG. 3. For example, in selected embodiments the advertisement can include information and/or a solicitation for property owners to make properties available for use in the rental program. In other embodiments, other forms of advertising (e.g., television advertisements, cold calls, and/or newspaper advertisements) can be used to solicit property owners to make properties available for use in the rental program.

In selected embodiments, once a property owner makes a property available via the Property Owner screen 400, the property management process/system can approve or disapprove the property for use in the program based in selected criteria. In certain embodiments this approval process can be completely automated and/or require input from a representative of the property management system/rental program. For example, in selected embodiments the property must pass a physical inspection before being approved for use in the rental program. In certain embodiments, the property management process/system can provide notification to the property owner (or the owner's representative) once use of the property is approved or disapproved (e.g., automatically once a determination is made).

Figure 5:
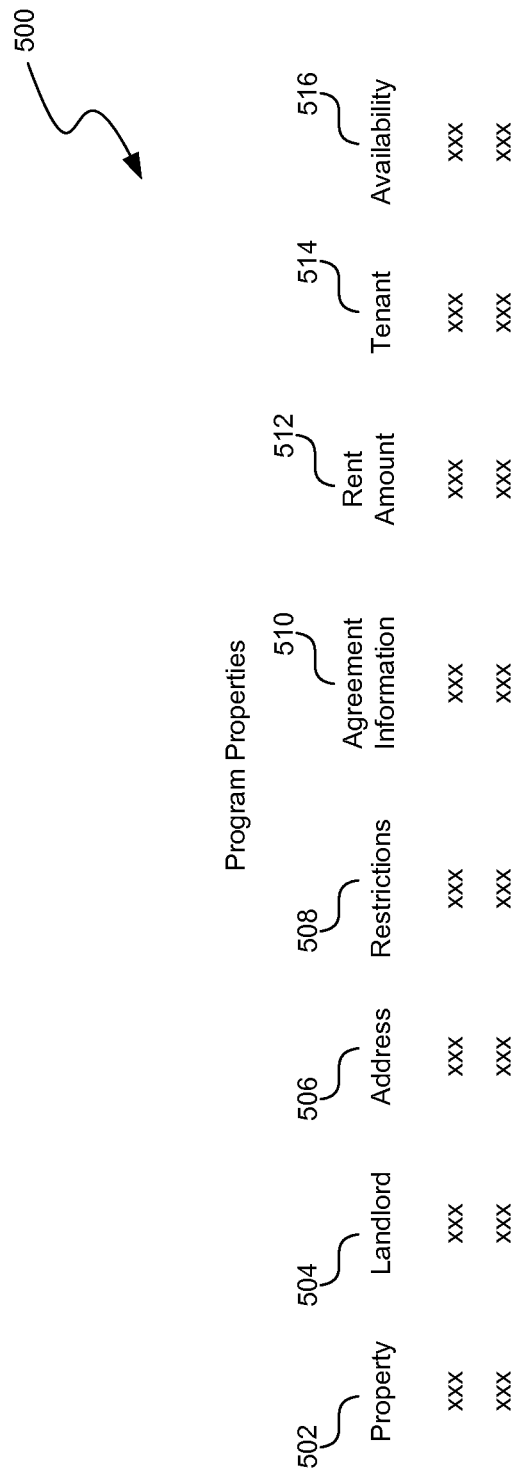
FIG. 5 is a partially schematic illustration of a portion of a Program Properties screen used to view the status of properties associated with the service management process in accordance with certain embodiments of the disclosure.

As discussed above, maintaining an inventory of property associated with a rental program can also include tracking the properties contained in the inventory or database (e.g., a searchable database). For example, as shown in FIG. 5, a service management system can display a Program Properties database screen 500 that can be used (e.g., by a representative of the entity administering the rental program) to track information associated with the properties contained in the inventory. In FIG. 5, the Program Properties screen 500 includes a Property field 502 listing property identifiers for various pieces of property (e.g., rental units) contained in the database. The screen 500 can also include a Landlord field 504 that includes the property owner and/or the designated representative (e.g., a property manager at an apartment complex) associated with each piece of property. For example, properties contained in the database can include privately held properties and/or publicly owned, funded, or administered properties, and the Landlord field 504 can include the designated representative for each piece of property.

The Program Properties screen 500 can also include an Address field 506 listing the address of each piece of property, a Restrictions field 508 listing restrictions (other information) associated with each piece of property, and a Agreement Information field 510 listing information concerning various lease/agreement requirements and/or a link to a lease/agreement associated with one or more pieces of property. In selected embodiments, the Program Properties screen 500 can also include a Rent Amount field 512 listing the amount of rent associated with each piece of property (e.g., the amount of rent per month or the amount of rent per week). In certain embodiments, the Program Properties screen 500 can also include a Tenant field 514 listing whether the property is occupied or not, the name of the tenant(s) occupying the property, and/or whether the tenant(s) are associated with the rental program.

In still other embodiments, the Program Properties screen 500 can include an Availability field 516 listing the availability of each piece of property. For example, the Availability field 516 can include the time periods during which the property is available for use in the rental program. Information associated with each piece of property can be updated over time to reflect the current status of the property (e.g., whether the property is occupied, when the property is projected to be available, and/or the like). In yet other embodiments, the Program Properties screen 500 can include other information. For example, in certain embodiments the Program Properties screen 500 it can include whether a security deposit has been collected, which entity holds the security deposit (e.g., an entity associated with the property owner or with the service management process/program), or the like. In some embodiments, selected property characteristics can be tracked (e.g., the condition of the properties, the responsiveness of the property owner to make repairs, etc.), and a property can be removed from the rental program if it becomes problematic or does not meet selected standards. In selected embodiments, information from the database represented by the Program Properties screen 500 can be used, presented, and/or displayed in other portions of the service management process, for example, for providing a list of properties available for rental to potential program participants, for reporting purposes, and/or the like.

Figure 6:
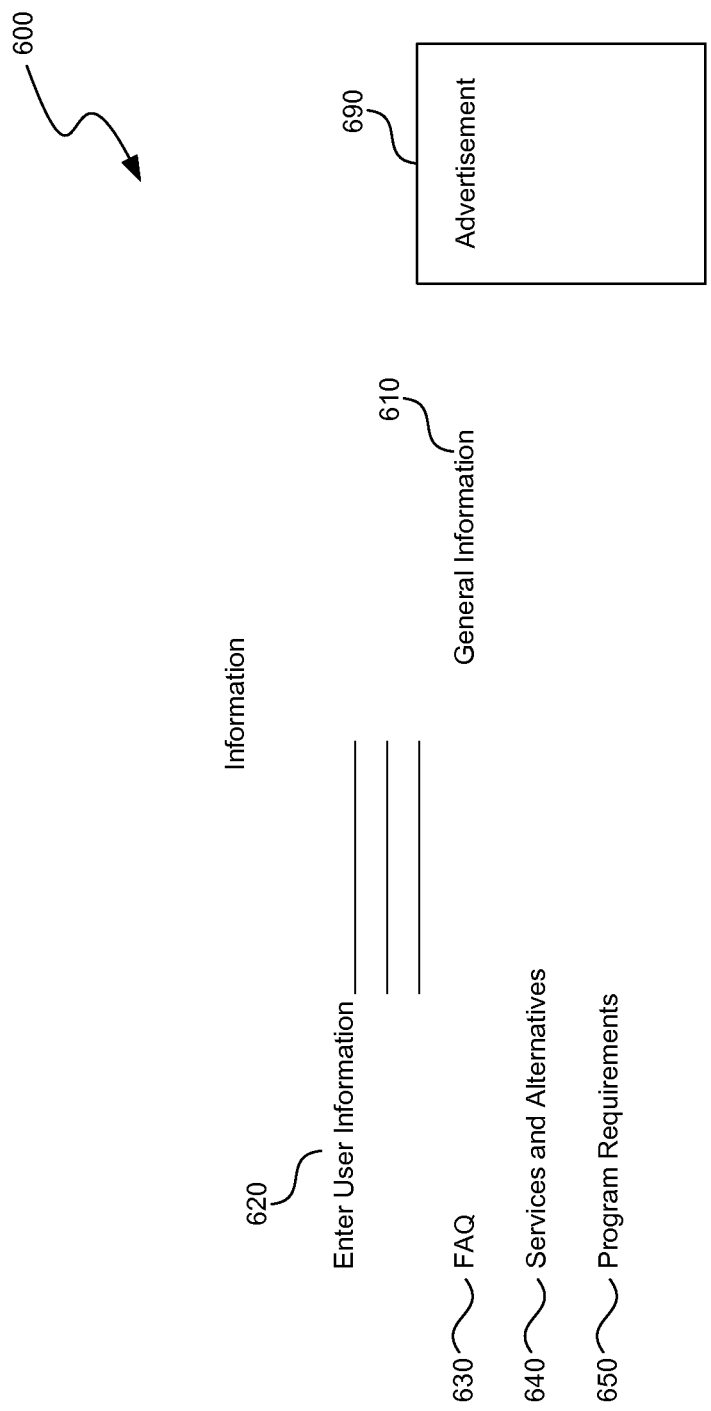
FIG. 6 is a partially schematic illustration of an Information screen used to provide information about various features of the service management process in accordance with selected embodiments of the disclosure.

FIG. 6 is a partially schematic illustration of an Information screen 600 used to provide information about various features of the service management process in accordance with selected embodiments of the disclosure. For example, in the illustrated embodiment the Information screen 600 can include general information 610 in the form of text and/or in the form of one or more interactive links to additional display page(s) containing information about the service management process and/or they rental program. In selected embodiments, a potential program participant can enter information associated with the program participant (e.g., about the potential program participant's circumstance) into the Enter User Information field(s) 620. For example, information associated with the program participant can include the participant's employment status, employer, legal issues, debt information, credit related information, substance abuse problems, and/or the like. This information can allow the service management system/process to direct the potential program participant to information that is especially relevant to their circumstance. In some embodiments, the information entered by the potential program participant can include an address where informational materials can be mailed.

The Information screen 600 can also include links to various pages containing more specific information about the service management process, the rental program, and/or other services or alternatives. For example, in the illustrated embodiment the Information screen 600 includes a Frequently Asked Questions link 630 which will direct the user of the Information screen 600 to page(s) that contain answers to frequently asked questions. In selected embodiments, the Information screen 600 can include a link to services and alternatives 640 that will direct the user of the Information screen 600 to page(s) containing information about services and/or alternatives (e.g., that may be relevant to a potential program participant's circumstance). In certain embodiments, the Services and Alternatives link 640 can include services and/or alternatives that are associated with the service management process, that are not associated with the service management process, or both. In selected embodiments, other services can include employment services, childcare services, medical services, transportation assistance/information, training programs, affordable healthcare, affordable insurance, educational services, counseling, churches, charities, support groups, rehabilitation services, and/or the like.

In still other embodiments, the Information screen 600 can include a Program Requirements link 650 that will provide the user of the Information screen 602 with page(s) associated with requirements that a program participant must meet and/or commit to in order to participate in the rental program. In certain embodiments, the user information entered by the potential program participant can be used to provide program requirement information to the potential program participant that is specific to the potential program participant's circumstance. In other embodiments, the program requirements can be general in nature and relevant to all potential program participants. The information screen 600 can also include one or more advertisements 690, similar to the advertisement discussed above with reference to FIGS. 3 and 4.

Figure 7:
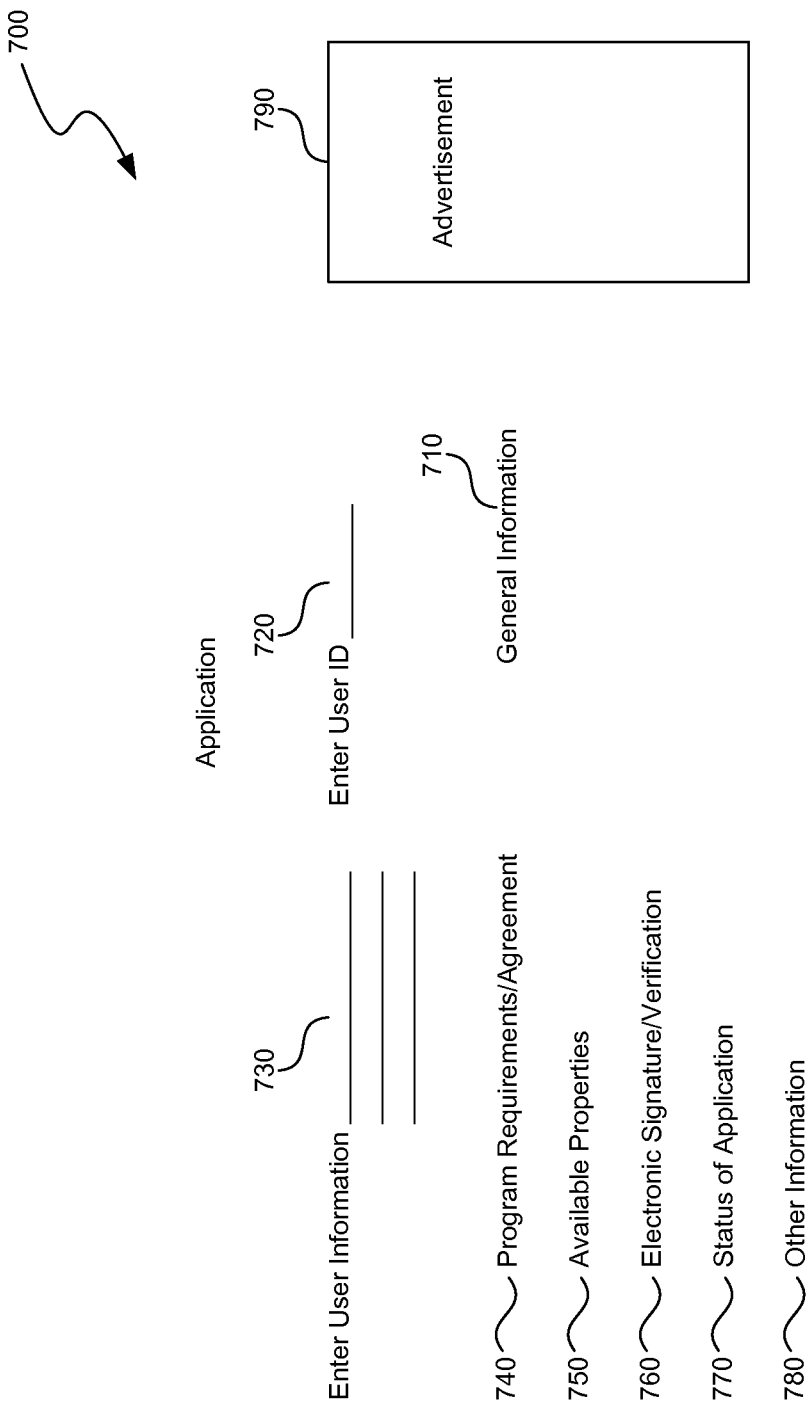
FIG. 7 is a partially schematic illustration of an Application screen used in processing an application associated with the service management process in accordance with embodiments of the disclosure.

FIG. 7 is a partially schematic illustration of an Application screen 700 used to process an application associated with the service management process in accordance with embodiments of the disclosure. For example, in selected embodiments processing an application can include processing an application for admission of a potential program participant into at least a portion of the service management process and/or processing an application to rent a property via the service management process (e.g., via a rental program). In FIG. 7, the Application screen 700 includes general information 710 in the form of text and/or a link to information relevant to the application process. Additionally, in the illustrated embodiment the Application screen 700 includes an Enter User Information Field 730 and/or an Enter User ID field 720.

In selected embodiments, a potential program participant will have signed selected papers indicating the consent and authorization necessary to use the service management process and/or enter the rental program before accessing the Application screen 700. Upon signing the selected papers, the potential program participant will have been given an ID. Accordingly, the potential program participant can enter the ID in to the Enter User ID field 720 and then can enter additional information relevant to the potential program participant into the enter User Information field 730. In certain embodiments, in order to access and/or enter information on the Application Screen, a potential program participant must enter an ID in the Enter User ID field 720 and an Electronic Signature/Verification field 760, similar to the Electronic Signature/Verification field discussed above with reference to FIG. 4 (e.g., to provide additional security and/or privacy).

In other embodiments, a potential program participant can enter information into the Enter User Information field 730 and the potential program participant will be assigned an ID (e.g., an ID will appear in the Enter User ID field 720), which can be used when the potential program participant subsequently accesses the Application screen 700 and/or other portions of the service management system/process. In still other embodiments, if a potential program participant has entered selected information into another screen associated with the service management process (e.g., the Information screen), at least a portion of the selected information can be automatically transferred to the User Information field 730 when the potential program participant selects the Application screen 700.

In the illustrated embodiment, the Application screen 700 includes various links associated with additional screens that the potential program participant can be required to access and complete (e.g., enter information) and/or that provide feedback or other information. For example, in FIG. 7 the Application screen 700 includes a Program Requirements/Agreement link 740 that provides access to a list of specific requirements and conditions that a potential program participant must agree to/adhere to in order to participate and/or maintain participation in the rental program. For example, requirements for program participation may include a potential program participant to pay rent weekly (e.g., via an electronic deposit or direct deposit or credit enhancing savings and or payment systems); to pay a program participation fee and/or processing fee; to maintain employment; to report loss of employment within a specified time (e.g., within 18 hours); to authorize a parole officer to forward reports to an administrator of the rental program; to agree to a representative of the rental program forwarding information concerning the potential program participant's compliance with rental program requirements to a third party (e.g., an associated landlord or parole officer); to authorize a background check; to authorize a credit check; to agree to refrain from using drugs, alcohol, abusive language, or violence; to agree to drug testing; to agree to keep weapons, pornography, drugs, and/or alcohol off a property rented via the rental program; to agree to selected property inspection criteria (within the limits of applicable law); to agree to refrain from buying or selling items while on the property; to agree to not loan money or incur additional debt without approval from a selected entity associated with the service management process/program and/or while on the property rented via the rental program; to agree to participate in/complete one or more selected educational programs; to agree to participate in/complete counseling; to agree to participate in/complete a budgeting program or process; to agree to budget to repay debts and expenses beyond the rent for property rented via the rental program (e.g., as budgeted for in the budgeting process); to agree to follow a budget produced by the budgeting process; and/or the like. Additionally, requirements for program participation may also include a potential program participant to agree to immediately vacate the property for non-adherence to the rental program requirements and/or to agree to forfeit selected rights provided by an applicable Landlord-Tenant Act or other law (e.g., within the limits of applicable laws). For example, in selected embodiments the requirements for program participation may require the program participant to agree to being immediately locked out of the property for the violation of selected program criteria and to agree to collect the participant's property by appointment subsequent to the lock out (within the limits of applicable laws).

For example, in Arizona, certain social service providers that provide assistance in obtaining housing incidental to offering to provide assistance or service in obtaining employment, childcare, healthcare, education, skills training, transportation, counseling, or other related services may be exempt from the Arizona Residential Landlord Tenant Act. Accordingly, in selected embodiments a service management process that provides a rental program that includes assistance in obtaining housing and offers at least one of the above mentioned additional services may be able to immediately evict a program participant from an associated rental property based on noncompliance with selected program elements or requirements. As discussed above, in certain embodiments the Program Requirements/Agreement link 740 can provide information concerning various rental program requirements or elements.

In selected embodiments the Program Requirements/Agreement link 740 can also provide the terms of a lease or agreement associated with one or more selected rental properties. Additionally, in certain embodiments the Program Requirements/Agreement link 740 can provide access to one or more agreement documents or contracts allowing a potential program participant to accept or agree to the associated program requirements/elements and/or terms of a lease agreement associated with a selected property. In selected embodiments, Electronic Signature/Verification field 760 can allow a potential program participant to provide an electronic signature or verification regarding an agreement or contract, in a manner similar to that discussed above with reference to FIG. 4.

In still other embodiments, the Application screen 700 can include one or more Other Information links 780, allowing a potential program participant to view other information regarding various aspects of the service management process and/or rental program. In selected embodiments, the Other Information links 780 can allow a potential program participant to electronically contact a representative for the rental program to ask selected questions about the rental program (e.g., via a chat room, email, and/or the like). In still other embodiments, the other Information link 780 can include a link to frequently asked questions and/or links to other organizations that might provide assistance, education, information, and/or the like to the individual (e.g., other organizations that are not directly tied to the service management process/program).

In certain embodiments, an application approval process can include evaluating information or data associated with a potential program participant. For example, once a potential program participant has entered the required information via the Application screen 700, a representative of the rental program can evaluate the entered data, gather/evaluate additional information, and/or approve the application. For example, in selected embodiments gathering additional information can include, by way of example, performing a credit check on the potential program participant, performing a background check on the potential program participant, and/or request additional information from the potential program participant. In certain embodiments, additional information can be requested from the potential program participant via an e-mail, a phone call, or the like.

In the illustrated embodiment, the Application screen 700 includes a Status of Application link 770 where a potential program participant can check to see if his/her application has been approved, disapproved, is being processed, and/or the like (e.g., after subsequently accessing the Application screen 700 and entering an ID or an ID and a password). In selected embodiments, Status of Application link 770 can also be used to gather additional information from the potential program participant. For example, in certain embodiments a request for additional information from the potential program participant can be posted under the Status of Application link 770. The potential program participant can view the information request (e.g., when checking the status of his or her application) and respond via an associated link.

In still other embodiments, a computing system similar to the one discussed above with reference to FIG. 1, can automatically perform selected portions of the approval process (e.g., by automatically running credit and/or background check(s), automatically assess/charge a fee for running the credit and/or background check(s), automatically request additional information from the potential program participant, etc.). In still other embodiments, the approval process can be completely automated. For example, the computing system can gather additional information, score the information entered and gathered information, check for appropriate consent or agreements (e.g., an agreement to comply with rental program requirements), and issue a notification that the application has been approved, declined, and/or requires additional processing (e.g., an in person interview with a rental program representative).

In selected embodiments, processing an application can include providing information associated with various properties (e.g., rental units). For example, in the illustrated embodiment the Application screen 700 includes an Available Properties link 750 which can allow an applicant (e.g., a potential program participant or program participant) to view information associated with various properties that are available via the rental program. In certain embodiments, the applicant can then physically view selected properties to decide which property the applicant wishes to rent. The applicant can then use the Available Properties link 750 to select a property and/or apply to rent a selected property.

In selected embodiments, the rental properties link 750 is only available after selected information has been entered by the applicant on the Application screen 700 and only property suitable for the applicant are displayed via the Available Properties link 750 For example, in certain embodiments only properties that meet the applicants needs (e.g., number of bedrooms, etc.), only properties for which the applicant can qualify for based on the selected information, and/or only properties that the applicant has been pre-approved for based on the selected information are displayed. In other embodiments, where different rental properties have different rental program requirements and/or different lease terms, a applicant may be required to agree to additional rental program requirements and/or lease terms once certain properties are selected. In selected embodiments, these additional agreements can be made via a process similar to that discussed above (e.g., using the Electronic Signature/Verification field 760). In other embodiments, an applicant can be required to select a property from the Available Properties link 750 prior to accessing the Program Requirements/Agreement link 740 and the applicant's applications to enter the rental program and to rent a selected property can be made and processed concurrently.

In other embodiments, the service management process can send notification to the property owner or the owner's representative (e.g., an apartment manager) that the potential program participant qualifies to rent a selected property, prompt the property owner or representative to concur to the lease agreement if applicable (e.g., via electronic signature), and/or collect a security deposit from the program participant. In selected embodiments, some or all of these elements can be automated by a service management system (e.g., a computing system). In some embodiments, the Program Properties screen (discussed above with reference to FIG. 5) can automatically be updated once all of the leases/agreements have been executed to appropriately show the status of the selected property.

In certain embodiments, an entity associated with the service management process/program enters into a lease or agreement with a property owner or the property owner's representatives for a selected rental property (e.g., to rent the selected property). A program participant or the program participant's representative enters into a lease or agreement to rent the selected property from the entity associated with the service management process/program (e.g., subleasing the selected property from the entity). In other embodiments, the program participant enters into an agreement with the property owner to lease the selected property from the property owner (e.g., when required to qualify the property/lease for a tax exemption or a tax credit). In still other embodiments, there can be other arrangements.

For example, in selected embodiments the lease or agreement can involve the property owner (or their representative), the program participant, and an entity representing the service management process/program. For instance, the entity representing the service management process/program can act as a co-signer for the program participant in executing a lease or agreement between the property owner and the program participant, and the entity can execute a separate agreement regarding program participation requirements with the program participant. In yet other embodiments, the lease or agreement can include program participation requirements and can be signed by the property owner, the entity, and the program participant. In still other embodiments, other entities can be included in various agreements associated with the property management program (e.g., a financial institution/entity associated with a selected property or a program participant). In yet other embodiments, an automated portion of the service management process can be used to track agreements (e.g., lease agreements or lease to own agreements), but the actual agreements can be executed on paper instead of via electronic signature.

Although some of the embodiments described above have been discussed with reference to a single applicant, in other embodiments multiple applicants (e.g., husband and wife) can access the Application screen and/or participate in the application process jointly. In still other embodiments, an applicant's representative can access and/or interact with various portions the Application screen on behalf of the applicant. In still other embodiments, an operator or representative of the rental program can access and/or interact with the Application screen 700 on behalf of an applicant, for example, when the applicant visits an office associated with the service management process and/or the rental program. In yet other embodiments, as discussed above, an applicant can sign papers associated with entry into the rental program and then access the Application screen 700 via computer kiosk, home computer, portable computing device, and/or the like. In the illustrated embodiment, the Application screen 700 also includes one or more advertisements 790 similar to those discussed above with reference to FIGS. 3 and 4.

Figure 8:
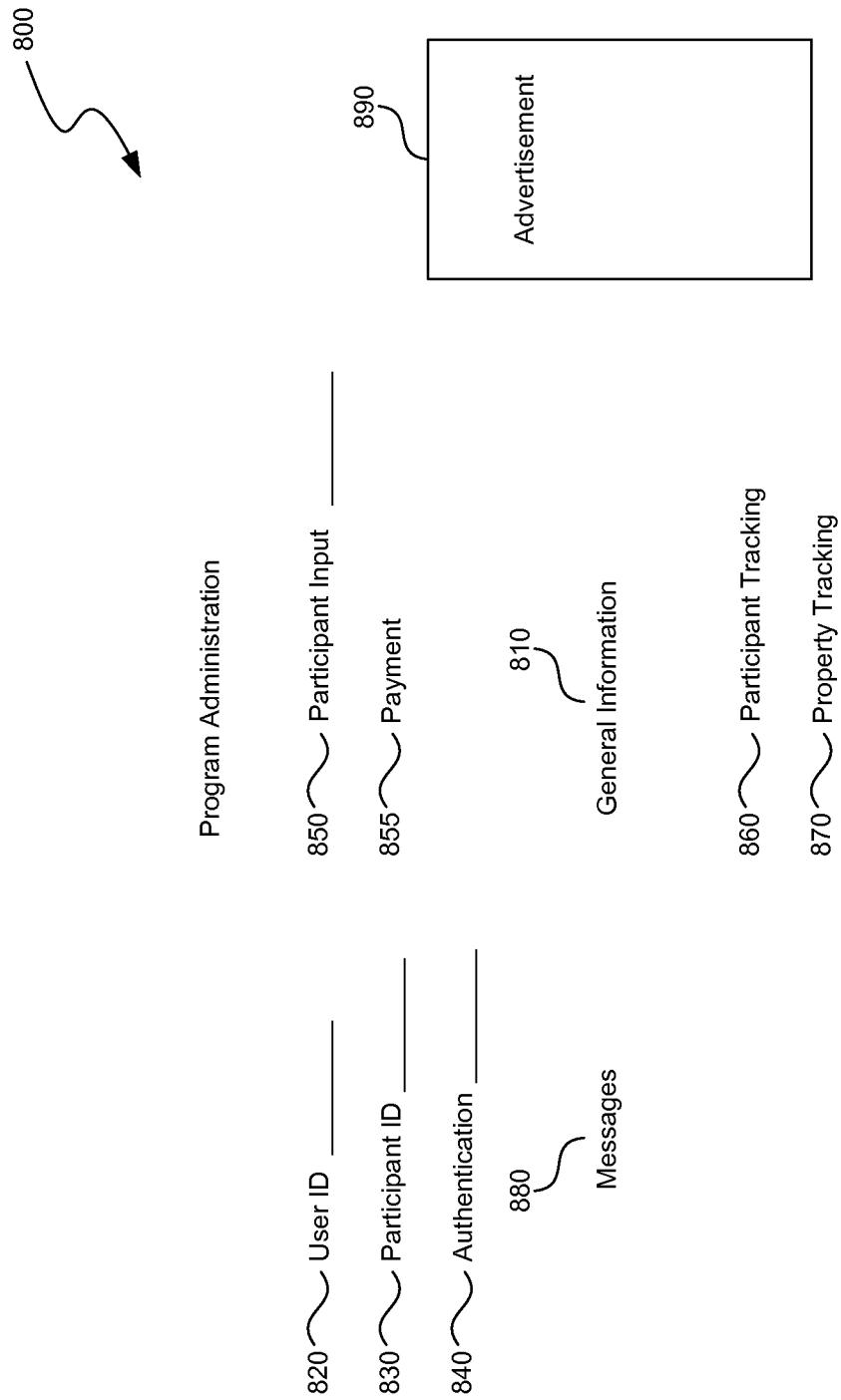
FIG. 8 is a partially schematic illustration of a Program Administration screen used in administering various features of the service management process in accordance with certain embodiments of the disclosure.

FIG. 8 is a partially schematic illustration of a Program Administration screen 800 used in administering various features of the service management process in accordance with certain embodiments of the disclosure. In selected embodiments, the Program Administration screen 800 can be accessed by a representative of the rental program or service management process, a program participant or designated representative, a property owner or designated representative, and/or other entities associated with the service management process, rental property, or program participants. In certain embodiments, the Program Administration screen 800 can include General Information 810 in the form of text and/or interactive link(s) to other screens containing information associated with a service management process and/or the administration of the rental program. Additionally, in selected embodiments the Program Administration screen 800 can include one more advertisements 890 similar to those discussed above with reference to FIGS. 3 and 4.

In the illustrated embodiment, the user of the Program Administration screen 800 can enter a user ID in the User ID field 820. In selected embodiments, access to certain portions of the Administration screen 800 may be limited based on the user ID entered. For example, a property owner may not have access to the same information that is assessable by a program participant and/or a representative of the rental program. In certain embodiments, a user of the Program Administration screen 800 may be required to enter an authentication code or some other form of authentication or verification via an Authentication link 840 before being able to access selected portions of the Program Administration screen 800.

In certain embodiments, where information about a specific program participant is to be provided by the Program Administration screen 800, a Participant ID may be entered in the Participant ID field 830. Accordingly, selected information regarding the program participant can be provided to various users of the Program Administration screen 800. For example, in certain embodiments a Participant Tracking link 860 can provide access to various other screen(s) that contain information about the selected program participant and/or the selected program participant's adherence to various program requirements. For example, in certain embodiments the results of various drug tests, the parole officer reports, employment verification, background check information, and the like can be accessed via the participant tracking link 860.

In some embodiments, the Program Administration screen 800 can include a Property Tracking link 870 that provides access to information regarding a selected piece of property. For example, in certain embodiments information regarding the property occupied by a selected program participant who's ID has been entered into the Participant ID field 830 can be provided by the Property Tracking link 870. In other embodiments, the Property Tracking link 870 can provide access to a selected number of properties contained in the property inventory or database discussed above with reference to FIGS. 2, 4 and 5.

In still other embodiments, the Program Administration screen 800 can include a Participant Input field 850 that provides a program participant the ability to provide selected inputs associated with the rental program. For example, in certain embodiments the Participant Input field 850 can allow a program participant to authorize an electronic transfer of funds from a selected bank account to cover weekly or monthly rent. In other embodiments, weekly or monthly rent can be made by other methods (e.g., direct deposit, electronic transfer of funds, credit enhancing saving or payment systems, and/or the like). In certain embodiments, the Program Administration screen 800 can include a Payment Link 855 that provides a link to screens associated with information regarding the payment history of a selected program participant and/or a selected rental property. In still other embodiments, the Program Administration screen 800 can include a Messages link 880 that provides a link to messages, information, and/or notifications associated with the user ID entered in the User ID field 820.

Figure 9:
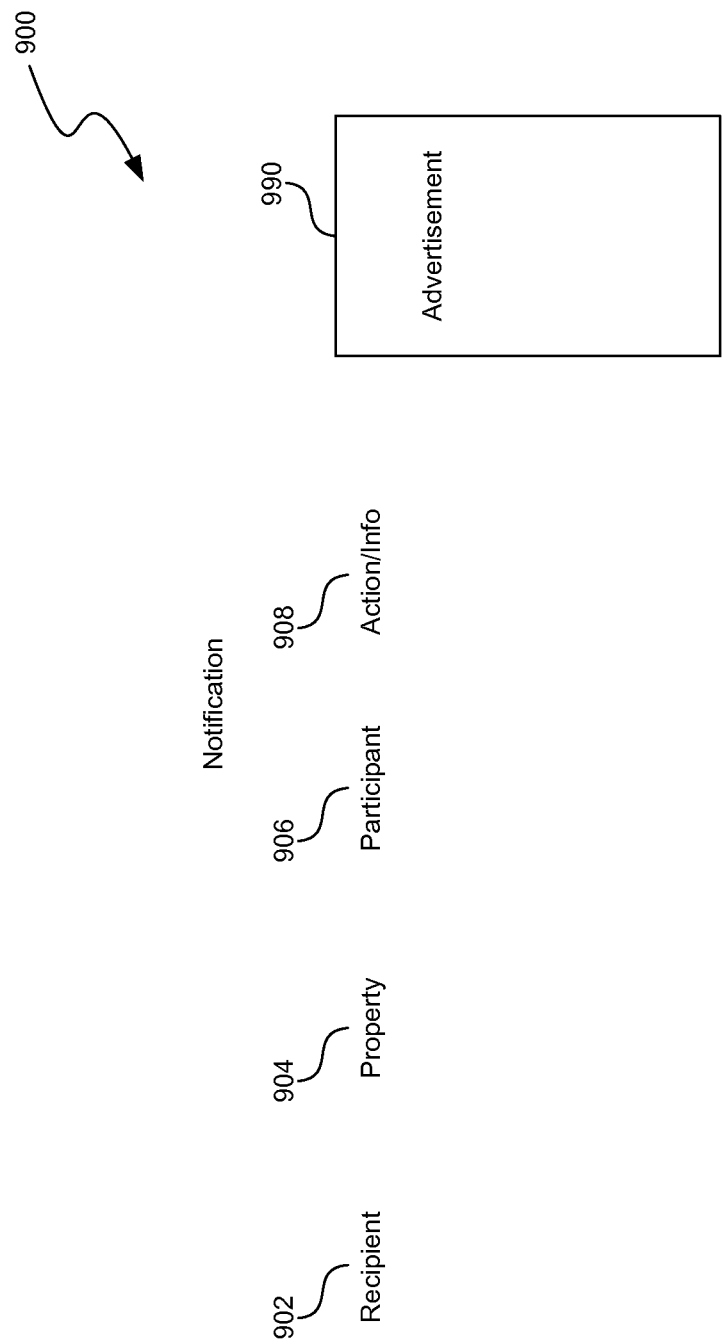
FIG. 9 is a partially schematic illustration of a notification used to provide information to parties associated with the service management process in accordance with certain embodiments of the disclosure.

For example, FIG. 9 is a partially schematic illustration of a notification 900 used to provide information to parties (e.g., people, entities, credit agencies, credit bureaus, and/or the like) associated with the service management process in accordance with certain embodiments of the disclosure. In selected embodiments, the notification in FIG. 9 can be a computer generated screen, for example, accessible from the Program Administration screen discussed above with reference to FIG. 8 and/or from the Rental Program screen discussed above with reference to FIG. 3. In other embodiments, the notification in FIG. 9 could include a paper message (e.g., a mailed or hand delivered notice), an email message, and/or the like.

In certain embodiments, the notification 900 can include various fields, including a Recipient field 902, a Property field 904, a Participant field 906, and an Action/Info field 908. Additionally, in selected embodiments the notification 900 can include one or more advertisements 990, similar to those discussed above with reference to FIGS. 3 and 4. For example, in certain embodiments the Recipient Field 902 can include the identity of one or more intended recipients of the message or notification, including individuals or entities that are merely receiving an informational copy of the message. The Property field 904 can identify one or more associated properties associated with the notification. The Participant field 906 can include the identity of one or more participants associated with the message and the Action/Info filed 908 can include information or action associated with the message. For example, in selected embodiments the Action/Info field can provide interactive links to additional information that allow a recipient to respond to the message, and/or that allows a recipient to take an appropriate action (e.g., authorize an action such as a transfer of funds).

In various embodiments, the notification 900 can be used to communicate approvals, for example in selected embodiments the Participant field 906 can include Potential Program Participants and the notification 900 can be used to let a potential program participant know that he or she has been accepted into the rental program, to request additional information from a potential program participant during the application/application approval process. In other embodiments, the notification 900 can be used to notify a property owner that a selected property has been entered into inventory. In still other embodiments, the notification 900 can be used to report information (e.g., to a landlord), request information, notify a program participant of an alleged non-compliance with program requirements, notify a program participant that he or she is being evicted from a rental property (e.g., part of process portion 214 discussed above with reference to FIG. 2) and/or to notify a participant that their participation in the rental program or another portion of the service management process is being terminated (e.g., part of process portion 214 discussed above with reference to FIG. 2). In selected embodiments, as discussed below in further detail, the notification 900 can include exchanging information (e.g., reporting a program participant's program participation/compliance) with a court or a program participant's creditor.

In certain embodiments the notifications 900 can be automatically generated by a computing system and/or generated by an entity associated with the rental program, including a representative of the rental program, a property owner (or the owner's representative), and/or a program participant (or the participant's representative). For example, in selected embodiments a computing system can send an automated notification reminding a program participant that rent is due, rent is past due, the participant is behind on completing selected education requirements or counseling, the participant is behind in completing an online budget or making budget entries/updates, and/or the like. In still other embodiments, an email can be sent to an entity associated with the rental program notifying the entity that there is a notification 900 to be viewed at a secure website and the notification can be posted in a secure website where it is accessible only after proper identification/authentication.

In yet other embodiments, the Participant Input field discussed above with reference to FIG. 8 can provide a link that allows a program participant or property owner to complete a notification and send it to appropriate entities. For example, in selected embodiments the notification 900 can be used by a program participant to notify the service management system/process that the program participant will be exiting the rental program or some other portion of the service management process on a selected date (e.g., part of process portion 214 discussed above with reference to FIG. 2). In selected embodiments, the service management system can automatically perform selected actions once a notice to exit a portion of the service management process is received (e.g., notifying a property owner that an associated property will be vacated, scheduling an exit inspection of the property, scheduling an exit interview with the program participant, setting up additional services for the program participant, and/or the like). In certain embodiments, a program participant can exit a portion of the service management process/program and remain in other portions. For example, in selected embodiments a program participant can exit the rental program, while remaining in the budgeting process and/or while using the service management process/program to repay debts. In other embodiments, a program participant may exit a required education program (e.g., after completion of the program) while remaining in the rental program.

Figure 10:
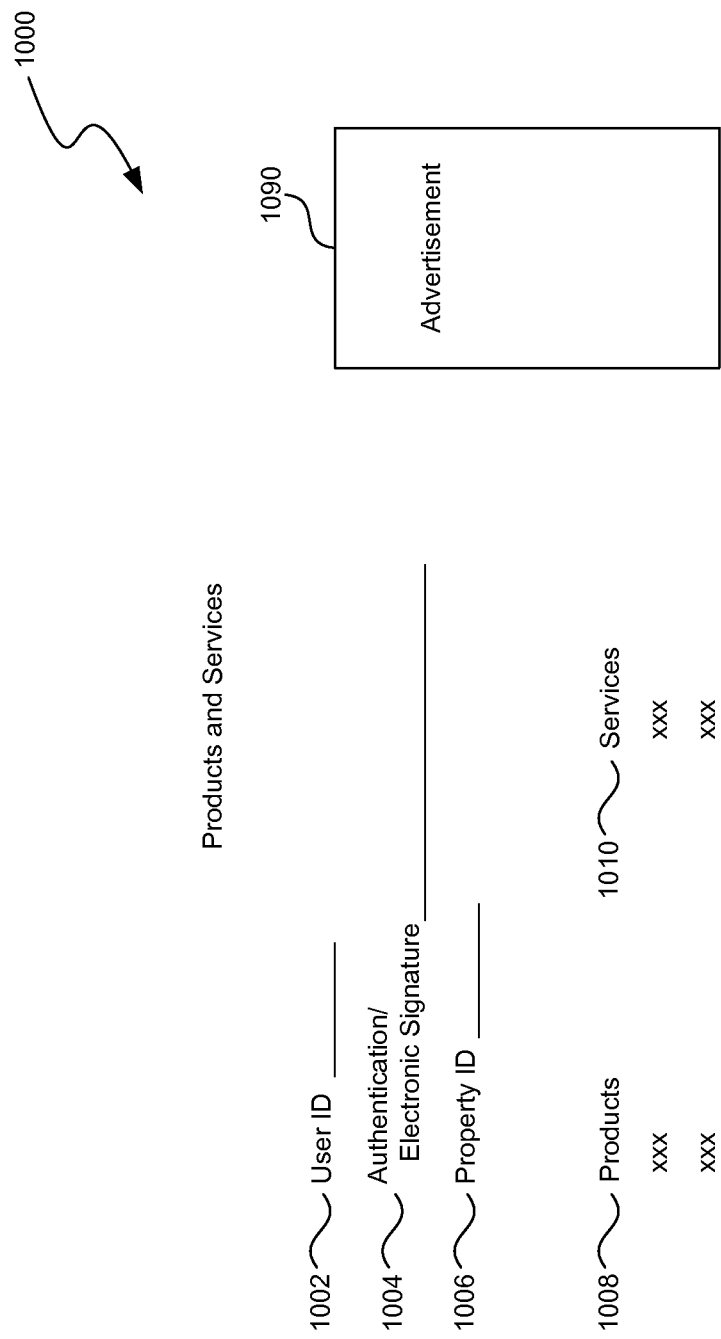
FIG. 10 is a partially schematic illustration of a Products and Services screen used to provide products and services to property owners and/or potential program participants in accordance with selected embodiments of the disclosure.

FIG. 10 is a partially schematic illustration of a Products and Services screen 1000 used to provide products and services to property owners and/or potential program participants in accordance with selected embodiments of the disclosure (e.g., as part of process portion 210 discussed above with reference to FIG. 2). In the illustrated embodiment, the Product and Services screen 1000 includes a User ID field 1002, an Authentication/Electronic Signature field 1004, and a Property ID field 1006. For example, in selected embodiments the User ID field 1002 can allow an entity associated with the rental program to enter a user identification and authenticate that identification using the Authentication/Electronic Signature field 1004. If use of a product and/or service from the Products and Services screen 1000 is predicated on a specific property, the Property ID field 1006 can be used to identify the corresponding property. If the use of products and/or services from the Products and Services screen 1000 is predicated on other information/requirements, the Products and Services screen 1000 and include other fields for entering the associated data. Additionally, in certain embodiments the Products and Services screen 1000 can include one or more advertisements 1090, similar to those discussed above with reference to FIGS. 3 and 4. For example, in some embodiments one more advertisements 1090 can include an advertisement associated with an entity that has provided access to products or services for use in the service management process.

In selected embodiments, once a user has been identified, the user can access various products and/or services from the Products portion 1008 and/or the Services portion 1010 of the Products and Services screen 1000. For example, in certain embodiments the Products portion 1008 can include a list of various products which the user can obtain, links that allow the user to order the products, and/or links to other screens (e.g., various online stores) which list various products which the user can obtain, and/or the like. In selected embodiments the products portion of the 1008 can include links to various charities that provide products to qualified individuals at no cost and/or reduced prices. In certain embodiments, the user identification entered into the User ID field 1002 can be used to determine if the specified user is qualified (e.g., whether a program participant has been qualified based on information obtained from the application process) to receive products from a selected charity.

In other embodiments, the Products portion 1008 can include links to various charities and/or online stores providing free or discounted products for use by property owners to upgrade properties that are available via the rental program. For example, in selected embodiments the User ID field and/or the Property ID field can be used to determine if a certain property/property owner is eligible to obtain products via the Products and Services screen. In still other embodiments, the Products and Services screen can allow a user to purchase or obtain actual products from the service management process/rental program. For example, in selected embodiments products can be donated and/or provided at a discount rate to an entity associated with the service management process. These products can then be provided via the service management process to program participants and/or property owners. In some embodiments, purchases of products or services can be made via credit card or a credit contract with an entity associated with the service management process/rental program (e.g., via an electronic signature process using an associated link and the Authentication/Electronic Signature field 1004).

In certain embodiments, the Services portion 1010 can include a list of various services which the user can obtain, links that allow the user to order the services, links to other screens which list of one or more services that a user may be able to obtain, links to selected services (e.g., education programs, counseling programs, and/or a budgeting processes), and/or the like. For example, in selected embodiments where rental program requirements include that a program participant enroll in/complete certain education and/or counseling programs, the Services portion 1010 can include links to corresponding online programs. In certain embodiments, the links to corresponding online programs can also include an online enrollment process associated with one or more of the corresponding programs. In selected embodiments, some of the services can be provided by an entity associated with the services management process and/or can be provided by other entities (e.g., charities, entities that donate services, and/or the like). As discussed above with reference to FIG. 8, in certain embodiments enrollment/participation in and/or completion of selected program can be monitored by the service management process. Also as discussed above, in selected embodiments use of certain products and/or services can be required for participation in the service management process (e.g., for either a program participant and/or a property owner).

Figure 11:
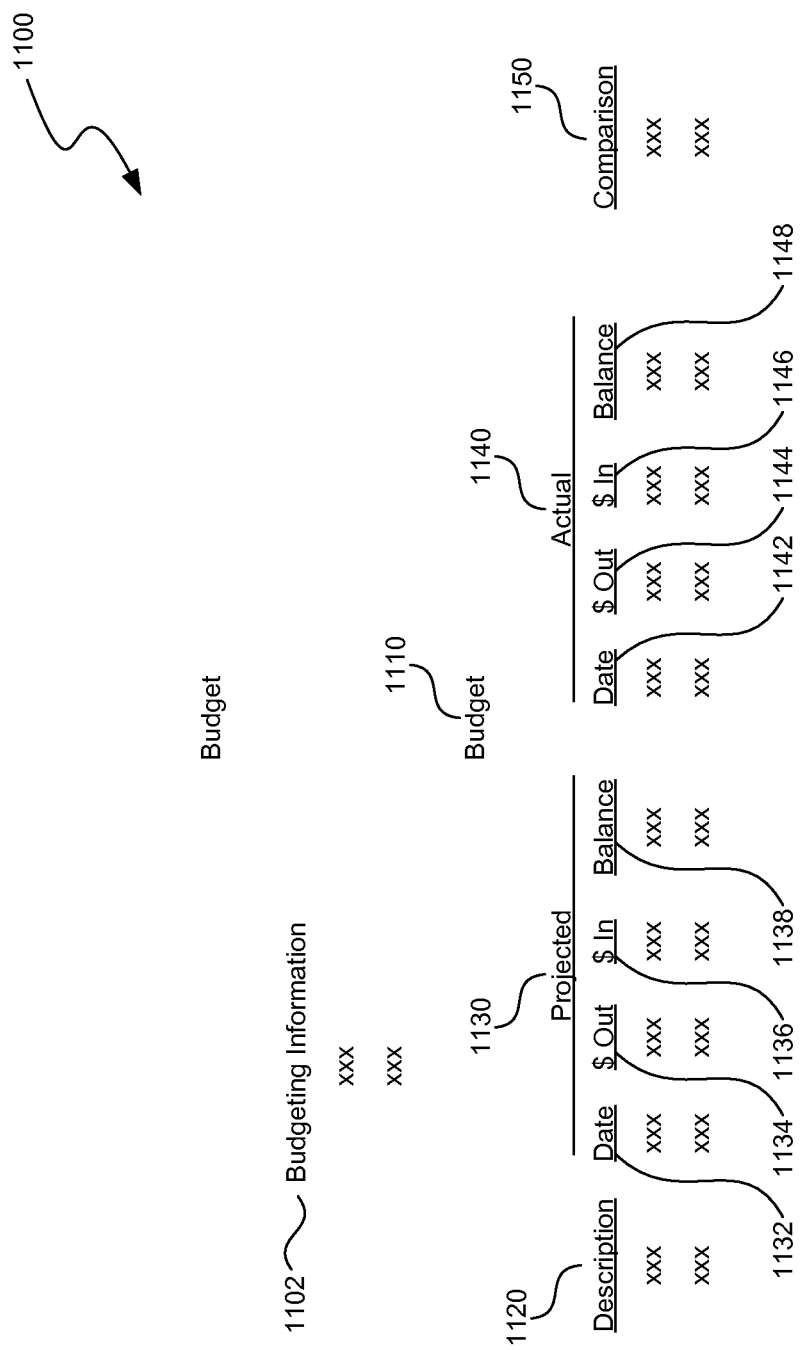
FIG. 11 is a partially schematic illustration of a Budget screen used to provide budgeting information and/or at least one budgeting process to program participants in accordance with certain embodiments of the disclosure.

FIG. 11 is a partially schematic illustration of a Budget screen 1100 used to provide budgeting information and/or at least one budgeting process to program participants in accordance with certain embodiments of the disclosure. For example, the Budget screen 1100 can be accessible to program participants via the services portion of the Products and Services screen discussed above with reference to FIG. 10. Accordingly, in selected embodiments the user will have entered a user identification into the User ID field of the Products and Services screen prior to accessing the Budget screen 1100. Accordingly, the Budget screen 1100 can be tailored for the specified user (e.g., program participant). In other embodiments, the Budget screen 1100 can be a standalone screen and/or can have fields for entering a user identification and for authenticating the user identification.

In FIG. 11 the Budget screen 1100 includes a Budgeting Information portion 1102 and a Budget portion of 1110. In the illustrated embodiment, the Budgeting Information portion 1102 includes interactive links to various online blocks of instruction on the importance of budgeting, how the budgeting process works, and the tools needed to successfully develop and adhere to a budget. In other embodiments, the Budgeting Information Portion 1102 can include text information associated with budgeting and/or other types of information. In still other embodiments, the Budgeting Information portion 1102 can include links to online counseling and/or to an online process for making an appointment with a budgeting counselor. In selected embodiments, a computing system and/or a representative of the rental program can track a program participants progress and/or completion of a budgeting education or budget counseling (e.g., using the Program Administration screen discussed above with reference to FIG. 8).

The Budget portion 1110, in FIG. 11, includes an interactive budget that allows the user to formulate a budget and track his or her performance against budget projections. For example, in the illustrated embodiment the Budget portion 1110 includes a Description portion 1120, a Projected portion 1130, an Actual portion 1140, and a Comparison portion 1150. In other embodiments, the Budget portion 1110 can have other portions and/or arrangements. In FIG. 11, the Description portion 1120 allows a user to enter the description of budget items corresponding to the projected and/or actual portions of the budget. For example, the Description portion 1120 can include descriptions for things such as rent, paycheck, groceries, and/or the like.

In the illustrated embodiment, the Projected portion 1130 includes a Date portion 1132, a Dollars Out portion 1134, a Dollars In portion of 1136, and a Balance portion 1138. Accordingly, the user can enter expected or projected income and expenses over a period of time and project the resulting cash flow balance at various points in time. In certain embodiments, the Actual portion 1140 can include a Date portion 1142, a Dollars Out portion 1144, a Dollars in portion 1146, and a Balance portion 1148. The Actual portion 1140, can allow a user to track his or her performance in adhering to the Projected portion 1130 of the budget and/or to make adjustments to the Projected portion 1130 of the budget when necessary. In order to aid the user in tracking his or her performance, the Comparison portion 1150 can calculate or compare the difference between the Balance in the Actual portion and the Projected portion over time. In certain embodiments, this feature can allow a program participant to understand his or her economic circumstance, to develop a budget projection, to make appropriate adjustments to the budget projection when necessary, to track performance, and/or the like. Additionally, in selected embodiments participation in the budgeting process can aid in developing discipline, responsibility, self-esteem, and accountability. In certain embodiments, a program participant's performance can be monitored by an entity associated with the rental program (e.g., using the Program Administration screen discussed above with reference to FIG. 8).

In some of the embodiments discussed above, a service management process/program can establish a mutually beneficial association between property owners with vacant rental units and applicants with credit issues, legal issues, and/or the like. For example, aspects of the service management program can provide applicants with the tools needed to be financially successful and/or provide assistance to improve the applicant's circumstance. Additionally, because the service management program provides these tools, monitoring, and/or the ability quickly remove an applicant that does not comply with program requirements from a rental unit, property owners can reduce their risk in renting their properties. Accordingly, property owners may be more willing to rent their property under a service management program to individuals having credit and/or legal issues that would otherwise cause the property owner to refuse to rent to the individual. This, in turn, can lead to higher occupancy rates for the property owners and a higher availability of affordable housing units for individuals having credit and/or legal issues. Additionally, in selected embodiments certain program requirements and/or the structure provided by the service management program may aid program participants to be more successful and responsible, and thereby less likely to commit crimes.

Furthermore, in some of the embodiments discussed above a service management process can be used to aid program participants with credit repair and/or debt consolidation. For example, in certain embodiments program participants can be required to budget to repay various debts in addition to paying rent and current expenses (e.g. rental debt, rental loans, and/or microloans). Additionally, in some embodiments the program participant can be required to pay an entity associated with the service management process/rental program for services associated with the service management process (e.g., administration expenses and/or the like). In other embodiments, the program participant can be required to make charitable donations (e.g., to reinforce social responsibility or to give back to organizations that have aided the individual in the past).

In certain embodiments, the program participant can be required to make some or all of the payments associated with his or her budget via an electronic banking process (e.g., direct deposit). For example, the program participant can be required to use an electronic banking process to pay periodic rent payments, a fee for participating in the service management program (e.g., one time or periodic), periodic payments associated with past debt, donations to entities from which the participant has received assistance (e.g., the Red Cross, community action agencies, or charitable organizations), and/or the like. In other embodiments, the program participant can be required to pay an entity associated with the service management program and the entity makes the associate payments according to the participant's budget. For example, in selected embodiments the program participant can pay rent and periodic debt repayments to the entity associated with the service management program, and the entity can pay the property owner and associated debtors. In certain embodiments, an entity associate with the service management program can aid a participant in restructuring or consolidating debt to allow a manageable repayment plan. In selected embodiments, if a participant can successfully repay debt and/or show a history of being fiscally responsible, his or her credit rating may improve.

In selected embodiments, a service management program can combine elements of various public, non-profit, for profit, and/or private elements to provide assistance to those in need (e.g., those in need of improving their life circumstances). For example, in selected embodiments portions of a service management program can be used as part of, or in conjunction with, a government program that provide relief to the homeless and/or those in need (e.g., by providing housing assistance, secure environments in which to live, counseling, self-development programs, education, rehabilitation, other types of social services, and/or the like). In certain embodiments, the structure of a service management program (e.g., tracking, monitoring, and/or budgeting elements) can be used to aid in managing, tracking, and/or regulating the use of public funds associated with various government programs providing these types of services to those in need (e.g., social services providers). For example, in selected embodiments certain properties may have to meet certain requirements in order to receive public funding under certain programs and/or applicants may have to meet certain criteria to rent selected properties that receive public funding under certain programs. In certain embodiments, these requirements and criterion can be an integral part of the requirements, agreements, and/or the like discussed above with reference to various embodiments (e.g., Property Owner screen, the Program Property screen, and/or the Application screen). In other embodiments, a service management program can combine the use of public and/or private housing (e.g., rental properties and/or public housing programs) with non-profit organization programs (e.g., programs associated with the International Crime Free Association of Mesa, Ariz.; charity programs; church programs; and/or the like) to provide assistance to those in need.

In yet other embodiments, a database (e.g., a searchable database) with various property management program statistics or characteristics can be maintained. For example, in certain embodiments statistics/characteristics can include why program participants fail and are removed from the program, which services successful participants generally use, whether there is a correlation between selected properties and the success of program participants placed in those selected properties, and/or the like. In selected embodiments, information from this database can be used to determine where funds can be spent to do the most good and/or to adjust the program. For example, in certain embodiments if program participants in a selected property have a high failure rate, the selected property might be removed from the program.

In still other embodiments, portions of a service management system might be used by the courts or other portions of the legal system (within the limits of applicable law). For example, in selected embodiments participation in a service management system could be used as a condition of parole or probation. For example, in selected embodiments a court might allow a drug offender to attend drug rehabilitation, perform community service, and participate in a service management program (e.g., to obtain affordable housing and insure compliance with a budgeting process). In other embodiments, participation in a service management program could be required as a condition of a work release program and/or required in lieu of transitional housing arrangements once a person is paroled or released from being incarcerated.

In certain embodiments, a court might allow participation in a service management program in lieu of eviction, for example, by staying the eviction process and allowing the property owner to rent to the tenant via a property management program. In still other embodiments, participation in portions of the services management program might be approved or mandated by a court for an individual undergoing a bankruptcy proceeding. In other embodiments, a property involved in a bankruptcy proceeding might be made available for rental in a service management program (e.g., with court approval and/or under court direction) in order to provide rental income at an acceptable level of risk. In still other embodiments, where an individual is found liable for court cost, attorney fees, and other related legal cost, a participant might be required to repay these costs via a service management program. For example, an individual found liable for certain legal cost in a drug related conviction resulting in mandatory participation in a service management process might be required to repay selected accrued legal expenses, along with other debts, as discussed above with reference to FIG. 11.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

In general, the above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments. Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the data collection and processing system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, a number of aspects of the invention may be embodied in a computer-readable medium. Accordingly, the inventors reserve the right to add additional claims after filing the application to pursue such additional claim forms for other aspects of the invention.

I claim:

1. A computer implemented method for improving (i) tracking of compliance with and (ii) management of rental agreements associated with a government program, the method comprising:
storing, in one or more network-accessible storage devices, one or more databases of information relating to a rental program, wherein the one or more databases include at least one database of housing units associated with the rental program;
receiving, from a renter, an application to enter the rental program;
processing the application using one or more data processing components in communication with the one or more network-accessible storage devices, wherein processing the application includes generating a rental agreement, and wherein generating the rental agreement includes (i) associating an available housing unit in the at least one database of housing units with the renter and (ii) defining program participation requirements, and further wherein the program participation requirements include (a) a requirement that the renter establish a budget to repay a loan in addition to paying rent and (b) a requirement that the renter make rental payments in accordance with the budget;
receiving an indication of consent to the rental agreement from the renter;
storing, in the one or more network-accessible storage devices, the budget established by the renter;
in accordance with the rental agreement and the budget, paying, using the one or more processors, a first portion of a rental payment to a property owner of the housing unit and a second portion of the rental payment to a debtor associated with the loan;
automatically generating, using the one or more processors, credit bureau arranged credit information of the renter based on the rental payment;
automatically generating, using the one or more processors, a notification to one or more credit bureaus, wherein automatically generating the notification includes populating the notification with the credit bureau arranged credit information; and
sending, using the one or more processors, the notification to the one or more credit bureaus.

2. The method of claim 1, further comprising sending the notification to the one or more credit bureaus via a network.

3. The method of claim 2 wherein the rental payment is one of a plurality of rental payments, and wherein sending the notification to the one or more credit bureaus via the network includes sending a history of credit information having data associated with the plurality of rental payments.

4. The method of claim 1 wherein the rental agreement requires the rental payment as part of a manageable repayment plan that improves credit and successfully repays debt associated with the loan and associated with the rent, and wherein the rental agreement permits the renter to make rental payments via at least one of authorized electronic transfers of funds, direct deposits, and credit enhancing saving or payment systems.

5. The method of claim 1 wherein the loan is an approved microloan debt issued by a financial institution.

6. The method of claim 1 wherein the loan is issued without a credit check.

7. The method of claim 1, further comprising storing the credit information.

8. The method of claim 1 wherein the loan is a microloan issued to the renter.

9. The method of claim 1 wherein the loan is associated with an approved debt.

10. The method of claim 1 wherein the loan is associated with a plurality of pre-existing debts.

11. The method of claim 1 wherein the rental agreement requires issuance of the loan, and wherein the loan is unrelated to pre-existing debt.

12. The method of claim 1 wherein the rental agreement requires issuance of the loan, and wherein the loan is associated with payment of a pre-existing debt.

13. The method of claim 12 wherein the pre-existing debt comprises a debt to an entity unrelated to the property owner of the housing unit.

14. The method of claim 1, wherein processing the rental agreement includes matching the renter with the housing unit.

15. The method of claim 1, further comprising storing a record of the rental payment.

16. A non-transitory computer readable storage medium storing instructions that, when executed by a computer system, cause the computer system to perform operations for improving (i) tracking of compliance with and (ii) management of rental agreements associated with a government program, the operations comprising:

processing, using one or more processors in communication with one or more network-accessible storage devices, an application received from a renter to participate in the government program, wherein the application includes information related to the renter;

generating, using the one or more processors, a rental agreement based, at least in part, on the information related to the renter, wherein generating the rental agreement includes (i) associating the renter with an available housing unit and (ii) defining program participation requirements, and wherein the program participant requirements include (a) a requirement that the renter establish a budget to repay a loan in addition to paying rent and (b) a requirement that the renter make rental payments in accordance with the budget;

storing, in the one or more network-accessible storage devices, the budget established by the renter;

in accordance with the rental agreement and the budget, paying, using the one or more processors, a first portion of a rental payment to a property owner of the housing unit and a second portion of the rental payment to a debtor associated with the loan;

automatically converting, using the one or more processors, information associated with the rental payment into credit bureau arranged credit data; and transmitting, using the one or more processors, the credit data to a credit bureau via a network.

17. The non-transitory computer readable storage medium of claim 16 wherein the loan comprises a microloan issued to the renter of the housing unit as a condition of the rental agreement.

18. The non-transitory computer readable storage medium of claim 17 wherein the rental agreement restructures a pre-existing debt into the microloan.

19. The non-transitory computer readable storage medium of claim 16 wherein the credit data includes credit data corresponding to the first portion of the rental payment, credit data corresponding to the second portion of the rental payment, or a combination thereof.

20. The non-transitory computer readable storage medium of claim 17 wherein the microloan is unrelated to pre-existing debt, and wherein the rental agreement requires the microloan based on a determination that the renter's credit rating needs improvement.

21. The non-transitory computer readable storage medium of claim 16 wherein the operations further include transmitting, using the one or more processors via the network, an indication of payment of the rental payment to the property owner of the housing unit.

22. The non-transitory computer readable storage medium of claim 16 wherein the operations further include transmitting, using the one or more processors via the network, information associated with the rental payment to a database stored on the one or more network-accessible storage devices, wherein the database includes information associated with the housing unit, and wherein the information associated with the rental payment is associated with the housing unit within the database.

\* \* \* \* \*